(12) United States Patent
Henry et al.

(10) Patent No.: US 8,820,058 B2
(45) Date of Patent: Sep. 2, 2014

(54) SYSTEM, METHOD, AND APPARATUS FOR DETERMINING SOLID STORAGE MEDIA QUALITY FOR A $NO_x$ REDUCTANT

(75) Inventors: Cary Henry, Helotes, TX (US); Neal W. Currier, Columbus, IN (US); Aleksey Yezerets, Columbus, IN (US); Michael J. Ruth, Franklin, IN (US)

(73) Assignee: Cummins Inc., Columbus, IN (US)

( * ) Notice: Subject to any disclaimer, the term of this patent is extended or adjusted under 35 U.S.C. 154(b) by 101 days.

(21) Appl. No.: 13/364,609

(22) Filed: Feb. 2, 2012

(65) Prior Publication Data

US 2013/0199158 A1    Aug. 8, 2013

(51) Int. Cl.
*F01N 3/00* (2006.01)
*F01N 3/10* (2006.01)
*F01N 3/02* (2006.01)

(52) U.S. Cl.
USPC ............ 60/295; 60/274; 60/277; 60/286; 60/301; 60/303; 60/311

(58) Field of Classification Search
USPC ........... 60/274, 277, 286, 295, 299, 301, 303, 60/311; 422/108–110; 423/239.1
See application file for complete search history.

(56) References Cited

U.S. PATENT DOCUMENTS

| | | |
|---|---|---|
| 2009/0280047 A1 | 11/2009 | Christensen et al. |
| 2010/0021780 A1 | 1/2010 | Johannessen et al. |
| 2010/0086467 A1 | 4/2010 | Johansen et al. |
| 2011/0083621 A1 | 4/2011 | Ogunleye et al. |
| 2011/0209461 A1 | 9/2011 | Bays et al. |
| 2011/0239627 A1 | 10/2011 | Sisken et al. |
| 2011/0283677 A1 | 11/2011 | Kaefer |
| 2013/0213011 A1* | 8/2013 | Audouin ................... 60/274 |

FOREIGN PATENT DOCUMENTS

EP    2412946 A1 *  2/2012 ............. F01N 3/20
WO   WO 2011/103968 A2   9/2011

OTHER PUBLICATIONS

International Search Report and Written Opinion, International Application No. PCT/US2013/023340, Date of Mailing: Mar. 22, 2013, 9 pages.

* cited by examiner

*Primary Examiner* — Audrey K Bradley
(74) *Attorney, Agent, or Firm* — Krieg DeVault LLP

(57) ABSTRACT

A system and method includes an exhaust aftertreatment system for an internal combustion engine having a reductant stored in a solid storage media. The reductant is released by heating the solid storage media to convert the reductant to gaseous form. The system and method determines the quality of the solid storage media by measuring operating parameters of the aftertreatment system and comparing the operating parameters to expected parameters stored in a memory of a controller of the system.

15 Claims, 2 Drawing Sheets

SYSTEM, METHOD, AND APPARATUS FOR DETERMINING SOLID STORAGE MEDIA QUALITY FOR A $NO_x$ REDUCTANT

TECHNICAL FIELD

The technical field generally relates to determining the quality of a solid media storage system for reductant used in aftertreatment systems, and more particularly but not exclusively relates to aftertreatment systems with an $NO_x$ conversion catalyst for internal combustion engines.

BACKGROUND

Presently available internal combustion engines require aftertreatment systems in many cases to meet stringent emissions requirements. In one example of an aftertreatment system, solid materials for ammonia ($NH_3$) storage have been developed as a source of reductant in selective catalytic reduction (SCR). By dosing gaseous ammonia desorbed or generated from the decomposition of solid storage media, the SCR system is capable of working at temperatures below the current limits of traditional urea-based SCR systems. Solid storage media systems for $NH_3$ also operate without the negative aspects associated with urea-derived deposit problems in the exhaust system. However, solid storage media systems for $NH_3$ need to be re-charged or replaced when the stored $NH_3$ is depleted. Furthermore, it is desirable that the engine, vehicle, or other OEM manufacturer be able to determine or communicate if the $NH_3$ storage system requires service, has been tampered with, or otherwise is of insufficient quality to meet emissions requirements. Further, quality deficiencies may need to be reported for maintenance or regulatory requirements. Direct measurements and verification of the solid storage media quality are presently unavailable. Therefore, further technological developments are desirable in this area.

SUMMARY

One embodiment of the present application includes a unique apparatus, method and system for determining solid storage media quality for a $NO_x$ reductant. Other embodiments include unique $NO_x$ reductant solid storage media quality determining apparatuses, systems, and methods. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein.

DESCRIPTION OF THE ILLUSTRATIVE EMBODIMENTS

Figure 1:
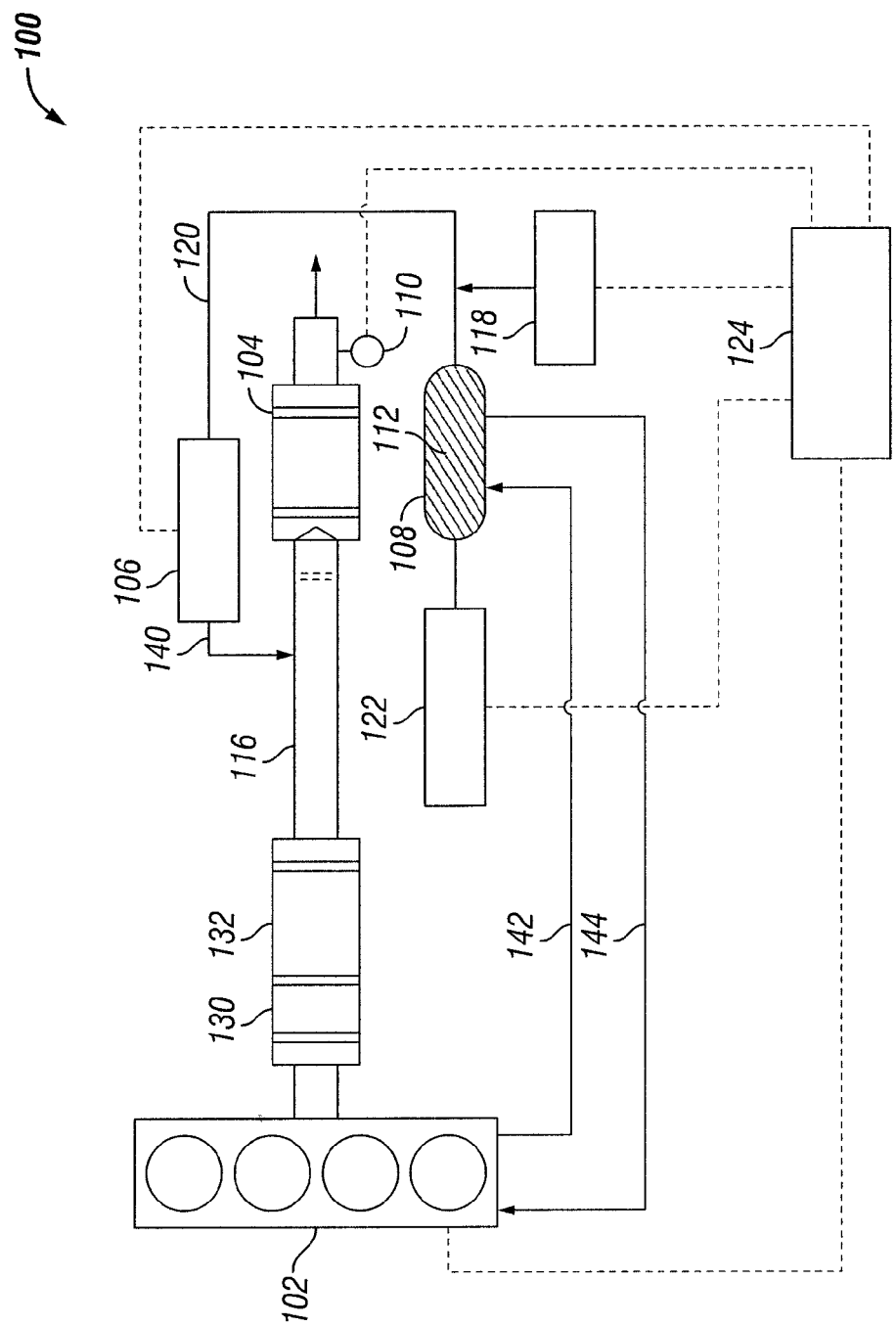
FIG. 1 is a schematic diagram of a system for determining a $NO_x$ reductant solid storage media quality.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

FIG. 1 is a schematic diagram of a system 100 for determining a $NO_x$ reductant solid storage media quality. The system 100 includes an internal combustion engine 102 producing an exhaust gas stream into exhaust flow path 116, where the exhaust gas stream is emitted from engine 102. In one specific embodiment, engine 102 is a diesel engine. The exhaust output by engine 102 includes $NO_x$ and other components which are to be reduced using an exhaust aftertreatment system in exhaust flow path 116. System 100 is illustrated schematically and may be included with a car, truck, bus, boat, recreational vehicle, construction equipment or another type of vehicle. Other embodiments include an engine provided in non-vehicular applications such as a generator set.

The system 100 includes an aftertreatment system with a $NO_x$ conversion catalyst 104 in exhaust flow path 116 that reduces at least a portion of the amount of $NO_x$ from the exhaust stream, and a reductant source 108 that stores an amount of $NO_x$ reductant 112 such as, for example, ammonia ($NH_3$), in a solid storage media. In one embodiment, the solid storage media may be any material involving adsorption or absorption of molecular ammonia in the solid, or a solid chemical compound which can be manipulated in order to produce gaseous ammonia. In one particular embodiment, the solid storage media includes metal ammine salts. The $NO_x$ reductant stored in the solid storage media housed in reductant source 108 may be ammonia or any other reductant understood in the art capable of being stored and selectively released from a solid storage media. Reductant source 108 may include one or more storage units having one or more compartments for storing ammonia in solid storage media.

System 100 also includes a reductant supply line 120 that receives gaseous reductant released from the solid storage media in reductant source 108, and provides the $NO_x$ reductant 112 to the exhaust flow path 116 at a position upstream of the $NO_x$ conversion catalyst 104. Gaseous reductant passes through a metering device 106 in reductant supply line 120. System 100 further includes a pressure sensor 118 in fluid communication with reductant supply line 120 and a temperature sensor 122 operatively connected to the solid storage media in reductant source 108. The system 100 may also include at least one $NO_x$ sensor 110 operably coupled to the exhaust flow path 116 at a position downstream of the $NO_x$ conversion catalyst 104. Additional temperature, pressure, mass flow, and other sensors in one or more components of the aftertreatment system are also contemplated and not precluded.

The system 100 further includes a controller 124 that performs certain operations for determining a solid storage media quality. The controller 124 includes modules structured to functionally execute operations to determine solid storage media quality. In certain embodiments, the controller 124 includes a gaseous reductant conversion module 202, a solid storage media status module 204, and a solid storage media quality module 206. More specific descriptions of the operations of the controller 124 for exemplary embodiments are included in the section referencing FIG. 2.

In one embodiment, the exhaust aftertreatment system may include an oxidation catalyst 130 which is in fluid communication with exhaust flow path 116 and is operable to catalyze oxidation of one or more compounds in exhaust flowing through exhaust flow path 116, for example, oxidation of unburned hydrocarbons or oxidation of NO to $NO_2$. Oxidation catalyst 130 can be any of various flow-through oxidation catalysts. Generally, oxidation catalyst 130 includes a substrate with an active catalyst layer configured to oxidize at least some particulate matter (e.g., the soluble organic fraction of soot) in the exhaust and reduce unburned hydrocarbons and CO in the exhaust to less environmentally harmful compounds. For example, in some implementations, the oxidation catalyst 130 may sufficiently reduce the hydrocarbon and CO concentrations in the exhaust to meet the requisite emissions standards.

The exhaust aftertreatment system may also include a diesel particulate filter 132 in fluid communication with exhaust flow path 116 and operable to reduce the level of particulates in exhaust flowing through exhaust flow path 116. In an exemplary embodiment diesel particulate filter 132 is a catalyzed soot filter. The diesel particulate filter 132 can be any of various particulate filters known in the art configured to reduce particulate matter concentrations, e.g., soot and ash, in the exhaust gas to meet requisite emission standards. The diesel particulate filter 132 includes a filter substrate that captures soot and other particulate matter generated by the engine 102. The system 100 periodically regenerates diesel particulate filter 132 to remove particulate matter that has accumulated on the diesel particulate filter over time. For example, diesel particulate filter 132 can be regenerated by increasing the temperature of the exhaust gas above a threshold temperature corresponding with combustion of the particulate matter.

In certain implementations, the system 100 includes an exhaust gas recirculation (EGR) line (not shown) configured to allow a portion of the exhaust gas generated by the engine to recirculate back into the engine for altering the combustion properties of the engine 102. The exhaust aftertreatment system may further include a hydrocarbon (HC) injector (not shown) which is supplied with HC from an HC reservoir and is operationally coupled to the exhaust stream at a position upstream of $NO_x$ conversion catalyst 104. Other embodiments of system 100 may include engine 102 having a common rail fuel system capable of injecting a post injection fuel where at least a portion of the post injection fuel does not combust to provide HC in the exhaust stream. Embodiments are also contemplated without a HC injector. Certain embodiments may also include an ammonia oxidation AMOX catalyst (not shown) at a position downstream of the $NO_x$ conversion catalyst 104, which is operable to catalyze the reaction of $NH_3$ which slips past the $NO_x$ conversion catalyst 104.

The exhaust aftertreatment system includes a reductant outlet 140 and the $NO_x$ conversion catalyst 104 downstream from particulate filter 132. Reductant outlet 140 is supplied with gaseous reductant from reductant source 108 and is operable to inject reductant gas into exhaust flow path 116. Reductant gas injected into exhaust flow path 116 is provided to the $NO_x$ conversion catalyst 104 which is in flow communication with exhaust flow path 116 and is operable to catalyze the reduction of $NO_x$. $NO_x$ conversion catalyst 104 can be any of various catalysts known in the art. For example, in some implementations, the $NO_x$ conversion catalyst is an SCR catalyst with a zeolite based catalyst, such as a Cu-Zeolite or a Fe-Zeolite catalyst, or a vanadium based catalyst.

Reductant source 108 is operatively coupled with at least one engine coolant feed line 142 and an engine coolant return line 144. Feed line 142 provides a source of heat that heats the solid storage media stored in reductant source 108 to release the stored reductant in gaseous form. Other embodiments contemplate other means for heating the solid storage media in reductant source 108, including, for example, an electrical heating element coupled to a power source such as a battery or generator. The heat source can be embedded in the solid storage media, or can extend around the outside of the solid storage media, or a combination of these arrangements. In one embodiment, heating of the solid storage material releases gaseous $NH_3$ from the solid storage media into supply line 120 by thermal desorption. The consumption rate of the released $NH_3$ gas is measured by metering device 106 as it is injected into exhaust flow path 116 upstream of the $NO_x$ conversion catalyst 104. Pressure sensor 118 provides signals corresponding to the pressure of the gas released into supply line 120, while temperature sensor 122 simultaneously provides signals corresponding to the temperature of the solid storage media in reductant source 108. The temperature and pressure signals may be provided continuously or discretely.

Exhaust flow path 116, as illustrated schematically in FIG. 1, may be provided in a variety of physical configurations. In an exemplary embodiment an exhaust flow path proceeds from the output of a turbocharger (not shown) of engine 102 through a conduit to a structure containing oxidation catalyst 130 and diesel particulate filter 132, through a second conduit to a structure containing the $NO_x$ conversion catalyst 104 and through another conduit which outlets to the ambient environment. In other embodiments, the components of the exhaust gas after-treatment system can be positioned in any of various arrangements, and the system can include other components or fewer components. Generally, exhaust gas treated in the exhaust gas after-treatment system and released into the atmosphere consequently contains significantly fewer pollutants, such as diesel particulate matter, $NO_x$, hydrocarbons, and carbon monoxide, than untreated exhaust gas.

Figure 2:
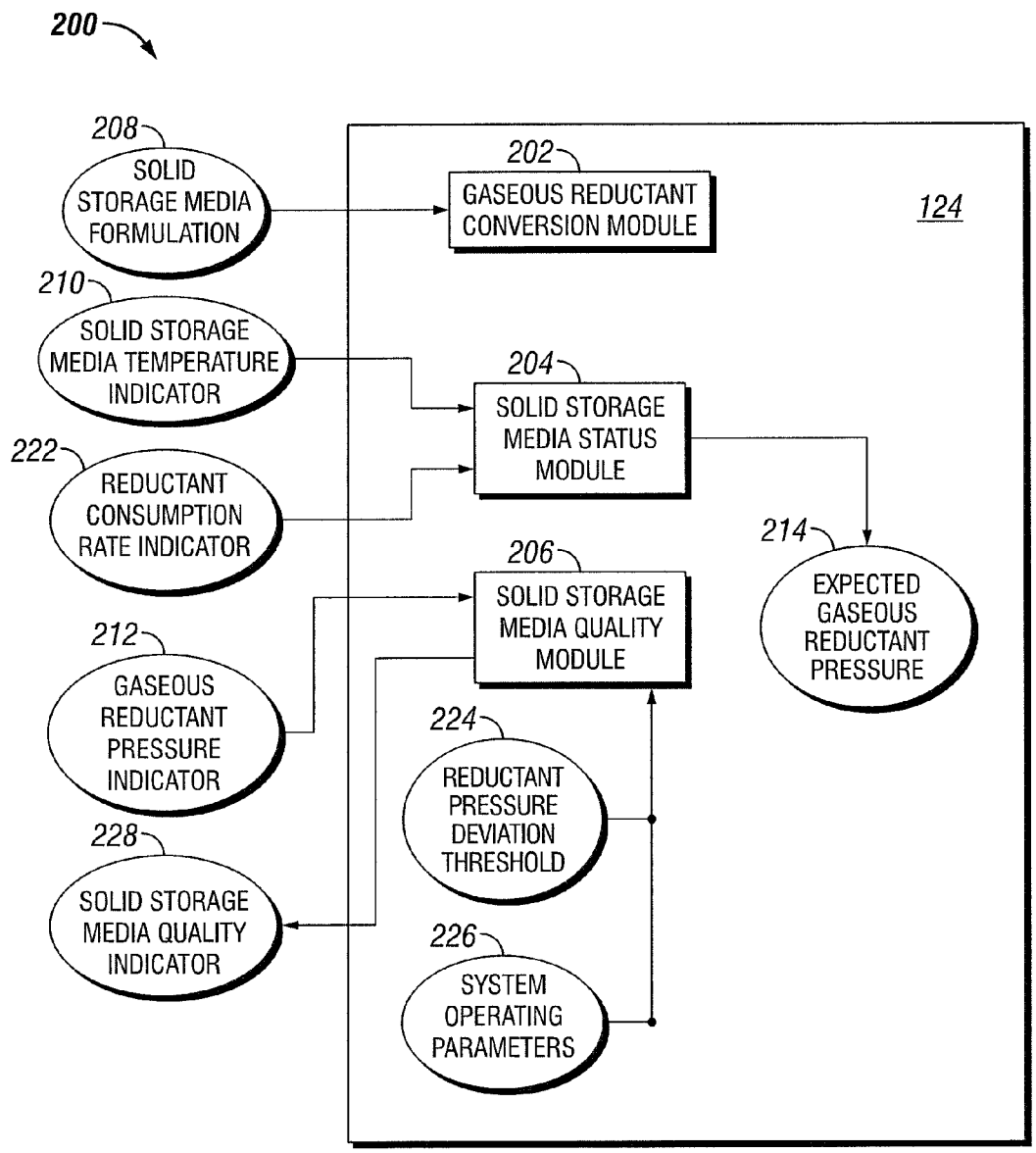
FIG. 2 is a schematic diagram of an apparatus for determining a $NO_x$ reductant solid storage media quality.

FIG. 2 is a schematic diagram of an apparatus 200 for determining a solid storage media quality. The apparatus 200 includes controller 124 having a gaseous reductant conversion module 202, a solid storage media status module 204, and a solid storage media quality module 206 structured to functionally execute the operations of the controller 124. The description herein, including modules, emphasizes the structural independence of the aspects of the controller 124, and illustrates one grouping of operations and responsibilities of the controller 124. Other groupings that execute similar overall operations are understood within the scope of the present application. Modules may be implemented in hardware and/or software on computer readable medium, and modules may be distributed across various hardware or software components.

Controller 124 forms a portion of a processing subsystem including one or more computing devices having memory as well as a number of inputs and outputs for interfacing with various sensors and systems of system 100. Controller 124 can be an electronic circuit comprised of one or more components, including digital circuitry, analog circuitry, or both. Controller 124 may be a single device or a distributed device. Controller 124 may include one or more control algorithms defined by operating logic in the form of software instructions, hardware instructions, firmware instructions, dedicated hardware, or the like.

In one form, controller 124 is of a programmable microcontroller solid-state integrated circuit type that includes memory and one or more central processing units. The memory of controller 124 includes of one or more components and can be of any of volatile or nonvolatile, solid-state, optical media, magnetic media, combinations of these, or other types of memory. Controller 124 can include signal conditioners, signal format converters (such as analog-to-digital and digital-to-analog converters), limiters, clamps, filters, and the like as needed to perform various control and regulation operations described herein. Controller 124, in an exemplary embodiment, may be a type of controller sometimes referred to as an electronic or engine control module (ECM), electronic or engine control unit (ECU) or the like, that is directed to the regulation and control of engine operation. Alternatively, controller 124 may be dedicated to the control of just the operations described herein or to a subset of controlled aspects of system 100.

The gaseous reductant conversion module 202 provides expected gaseous reductant conversion values based on the particular solid storage media formulation 208 for the solid storage media stored in reductant source 108. The reductant conversion values may be determined by any method understood in the art. Non-limiting examples include measuring or modeling a $NH_3$ gaseous pressure expected in supply line 120 based on a target operating temperature(s) of the selected solid storage media for converting $NH_3$ into gas from the solid storage media and various consumption rates of the $NH_3$ gas. In another example, the expected pressure is a range of pressures that are expected over a variety of operating conditions, including any one or combination of a range of operating temperatures for the solid storage media, the speed of engine 102, the load on engine 102, and the mass air flow through system 100.

These values for the expected pressure(s) of $NH_3$ gas can be created as a dynamic model or algorithm for each type of available solid storage media and stored in memory of controller 124 as experimental or theoretical mapping data or a look-up table for reference during engine operation. The gaseous reductant conversion module 202 may receive solid storage media formulation 208 as an input during the OEM assembly process, a datalink or network communication, and/or may read the solid media storage formulation 208 as a parameter stored on a computer readable medium.

The solid storage media status module 204 determines a solid storage media temperature indicator 210 and/or a reductant consumption rate indicator 222 and provides an expected gaseous reductant pressure 214 based on these indicators and the data maps or look-up tables stored in gaseous reductant conversion module 202. The solid storage media status module 204 may determine the solid storage media temperature indicator 210 from temperature sensor 122 embedded in the solid storage media of reductant source 108. Temperature sensor 122 may be a thermocouple, thermistor, or any other suitable device or combination of devices for determining the current operating temperature of the solid storage media. In one embodiment, temperature sensor 122 comprises multiple temperature sensors at various locations in the solid storage media which are averaged, weighted or are otherwise employed to provide an accurate indication of the average temperature of the entirety of the material comprising the solid storage media. This temperature may be conveyed from the temperature sensor 122 as a temperature value, a voltage which may be converted to a temperature value, and/or a digital signal which can be read by a processor or processor subsystem and is correlated to a solid storage media temperature value.

The solid storage media status module 204 may determine the reductant consumption rate indicator 222 by measurements from metering device 106. The consumption rate of the reductant gas can be communicated to solid storage media status module 204 as a quantity, rate or other signal which can be read by a processor or processor subsystem and is correlated to a consumption rate value. Furthermore, the expected gaseous reductant pressure in supply line 120 can be adjusted to compensate for the consumption rate of the reductant gas. For example, at lower consumption rates, the expected gaseous reductant pressure 214 in supply line 120 can be increased to accommodate for lesser utilization of reductant gas in $NO_x$ conversion. At higher consumption rates, the expected gaseous reductant pressure 214 in supply line 120 can be decreased to accommodate for greater utilization of reductant gas in $NO_x$ conversion.

The solid storage media quality module 206 may determine the gaseous reductant pressure indicator 212 from pressure sensor 118 in fluid communication with the reductant gas in supply line 120. Pressure sensor 118 may be a single pressure transducer, multiple pressure transducers, a single electromechanical pressure sensor, two inductive pressure sensors or any other combination of pressure sensor(s) that can be configured to determine a pressure in supply line 120. This pressure may be conveyed from the pressure sensor 118 as a pressure value, a voltage which may be converted to a pressure value, and/or a digital signal which can be read by a processor or processor subsystem and is correlated to a pressure value.

The solid storage media quality module 206 compares the expected gaseous reductant pressure 214 in supply line 120, determined from gaseous reductant conversion module 202 and the current solid storage media operating temperature 210 and $NH_3$ consumption rate indicator 222, to a current gaseous reductant pressure indication 212. If a substantial deviation is detected that exceeds reductant pressure deviation threshold 224, then controller 124 provides compliant degraded solid storage media quality indicator 228 to an onboard diagnostics system of the vehicle to signal that a service condition exists. The compliant degraded indication can indicate that a no/low reductant supply is available in the solid storage media, that an incorrect or improper solid storage media has been placed in reductant source 108 during a service event, or that the reductant system has been subject to tampering or other conditions such that it is not operating properly.

To avoid false positive indications that a reductant source service condition exists, the reductant pressure deviation threshold 224 can be established to account for expected operational variations in the precision of the temperature, pressure and consumption rate indicators and in variations of the solid storage media formulation. Furthermore, the solid storage media quality module 206 can be configured so that solid storage media quality indicators are provided during periods where engine and system operating parameters 226 are suitable for such a determination. For example, a predetermined period of continuous operation, a predetermined number or time period of positive compliant degraded conditions, or other condition may be required before acceptance of a positive indication that a solid storage media service condition exists.

The names described for the solid storage media quality indicator 222 are exemplary and non-limiting. Equivalent names, names conveying similar information, and numbers stored on computer readable media that have a translatable meaning to similar information are contemplated herein.

An exemplary procedure for determining a solid storage media quality for a reductant in an aftertreatment system is described. The exemplary procedure includes an operation to determine a first parameter value corresponding to an expected gaseous reductant pressure in a reductant supply line extending between the reductant source and the exhaust flow path based on a temperature of the solid storage media during operation and an operation to determine the consumption rate of the gaseous reductant by the aftertreatment system. The procedure includes a further operation to determine the actual pressure of the gaseous reductant in the reductant supply line substantially simultaneously with determining the temperature of the solid storage media. The procedure includes an operation to compare the actual pressure with the expected pressure, and to determine a solid storage media quality indicator in response to the comparison. The procedure may further include providing a compliant degraded indicator for the solid storage media if the actual pressure deviates from the expected pressure by more than a threshold amount.

The exemplary procedure includes an operation to determine the solid storage media quality indicator as compliant degraded due to a depletion of ammonia in the solid storage media, as an improper solid storage media material, or as a tampering or improper functioning of the solid storage media system. In certain embodiments, the solid storage media stores an exhaust treatment fluid that is a $NO_x$ reductant. In one particular embodiment, the $NO_x$ reductant is ammonia. In another specific embodiment, the solid storage material includes metal ammine salts.

As is evident from the figures and text presented above, a variety of embodiments according to the present invention are contemplated.

One exemplary embodiment is a method including determining an expected gaseous ammonia pressure in a reductant supply line based on a temperature of a solid storage media for the ammonia and a consumption rate of the gaseous ammonia by an aftertreatment system, determining an actual pressure of the gaseous ammonia in the reductant supply line, and determining a solid storage media quality based on the deviation of the actual pressure from the expected pressure.

Certain embodiments of the method include one or more of the operations described herein. Operations may be re-ordered, combined, split, omitted, or substituted. The method includes determining that the solid storage media quality has been compromised by, for example, a service event, by tampering, or by ammonia depletion from the solid storage media.

Another exemplary embodiment is a system including an internal combustion engine producing an exhaust stream, wherein the exhaust stream includes an amount of $NO_x$, a $NO_x$ conversion catalyst that reduces at least a portion of the amount of $NO_x$, a reductant source that stores an amount of a $NO_x$ reductant in a solid storage media and a reductant meter that receives the $NO_x$ reductant from a supply line connected to the reductant source and measure the consumption rate of the $NO_x$ reductant as it is provided to the exhaust stream at a position upstream of the $NO_x$ conversion catalyst. The system further includes at least one temperature sensor operably coupled to the solid storage media and at least one pressure sensor operably coupled to the supply line to determine the pressure of gaseous reductant in the supply line. The system further includes a controller structured to perform certain operations for determining a solid storage media fluid quality. The controller includes modules structured to functionally execute the operations, and in certain embodiments includes a gaseous reductant conversion module, a solid storage media status module, and a solid storage media quality module. The gaseous reductant module provides a reductant conversion value for the solid storage media provided in the reductant source. The solid storage media status module determines a solid storage media temperature indicator and a gaseous reductant consumption rate, and provides an expected gaseous reductant pressure in the supply line. The solid storage media quality module compares the expected pressure with an actual pressure of the gaseous reductant, and provides a solid storage media quality indicator in response to the comparison. In certain embodiments, the $NO_x$ reductant comprises ammonia.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
   heating a solid storage media in an exhaust aftertreatment system reductant source;
   determining an operating temperature of the solid storage media, the solid storage media storing a reductant and when heated the solid storage media releases the reductant as a gas into a supply line connected to an exhaust flow path;
   determining a consumption rate of the gaseous reductant released from the solid storage media;
   determining an actual pressure of the gaseous reductant in the supply line; and
   comparing the actual pressure to an expected pressure of the gaseous reductant in the supply line and determining a solid storage media quality indicator from the comparison, wherein the expected pressure is determined from the operating temperature and the consumption rate.

2. The method of claim 1, wherein the solid storage media comprises metal ammine salts.

3. The method of claim 1, wherein the reductant is ammonia.

4. The method of claim 1, wherein determining the solid storage media temperature includes receiving a signal from at least one temperature sensor embedded in the solid storage media.

5. The method of claim 1, wherein the supply line is connected to the exhaust flow path at a location upstream from an SCR catalyst.

6. The method of claim 1, wherein determining the consumption rate of the gaseous reductant includes providing a signal from a metering device in the supply line.

7. The method of claim 1, wherein heating the solid storage media includes heating the solid storage media with coolant from an engine connected to the exhaust aftertreatment system.

8. The method of claim 1, further comprising determining whether the actual pressure deviates from the expected pressure by more than a threshold amount before determining the solid storage media quality indicator.

9. The method of claim 8, further comprising determining operating parameters of the aftertreatment system in order to establish a condition for determining the solid storage media quality indicator.

10. A system, comprising:
- an internal combustion engine producing an exhaust stream, the exhaust stream including an amount of $NO_x$ emitted into an exhaust flow path;
- a $NO_x$ conversion catalyst in the exhaust flow path that reduces at least a portion of the amount of $NO_x$;
- a reductant source that stores an amount of a $NO_x$ reductant in a solid storage media and a reductant supply line that receives gaseous $NO_x$ reductant from the reductant source when the solid storage media is heated, wherein the supply line includes a metering device to measure a consumption rate of the gaseous reductant and provides the $NO_x$ reductant to the exhaust flow path at a position upstream of the $NO_x$ conversion catalyst;
- at least one temperature sensor operably coupled to the solid storage media and at least one pressure sensor operably coupled to the supply line; and
- a controller, comprising:
  - a reductant conversion module structured to provide expected pressures of the gaseous reductant in the supply line based on the type of solid storage media, the temperature of the solid storage media, and the consumption rate of the gaseous reductant;
  - a solid storage media status module structured to provide an expected pressure of the gaseous reductant based on a current temperature of the solid storage media and a current consumption rate of the gaseous reductant; and
  - a solid storage media quality module structured to compare an actual pressure in the supply line to the expected pressure and to determine a solid storage media quality indicator from the comparison.

11. The system of claim 10, wherein the $NO_x$ reductant comprises ammonia.

12. The system of claim 10, wherein the solid storage media comprises metal ammine salts.

13. The system of claim 10, wherein the exhaust flow path includes a diesel oxidation catalyst and a diesel particulate filter upstream from the $NO_x$ conversion catalyst.

14. The system of claim 10, wherein the solid storage media quality module is structured to determine if the solid storage media is emissions compliant.

15. The system of claim 14, wherein a determination that the solid storage media is emissions compliant is made when the actual pressure deviates from the expected pressure by more than a pressure deviation threshold.

\* \* \* \* \*